March 31, 1942. C. NESS ET AL 2,277,879
APPARATUS FOR CONTROLLING THE LEVEL OF FINELY
DIVIDED MATERIAL WITHIN A CONTAINER
Filed Oct. 12, 1938 3 Sheets-Sheet 1
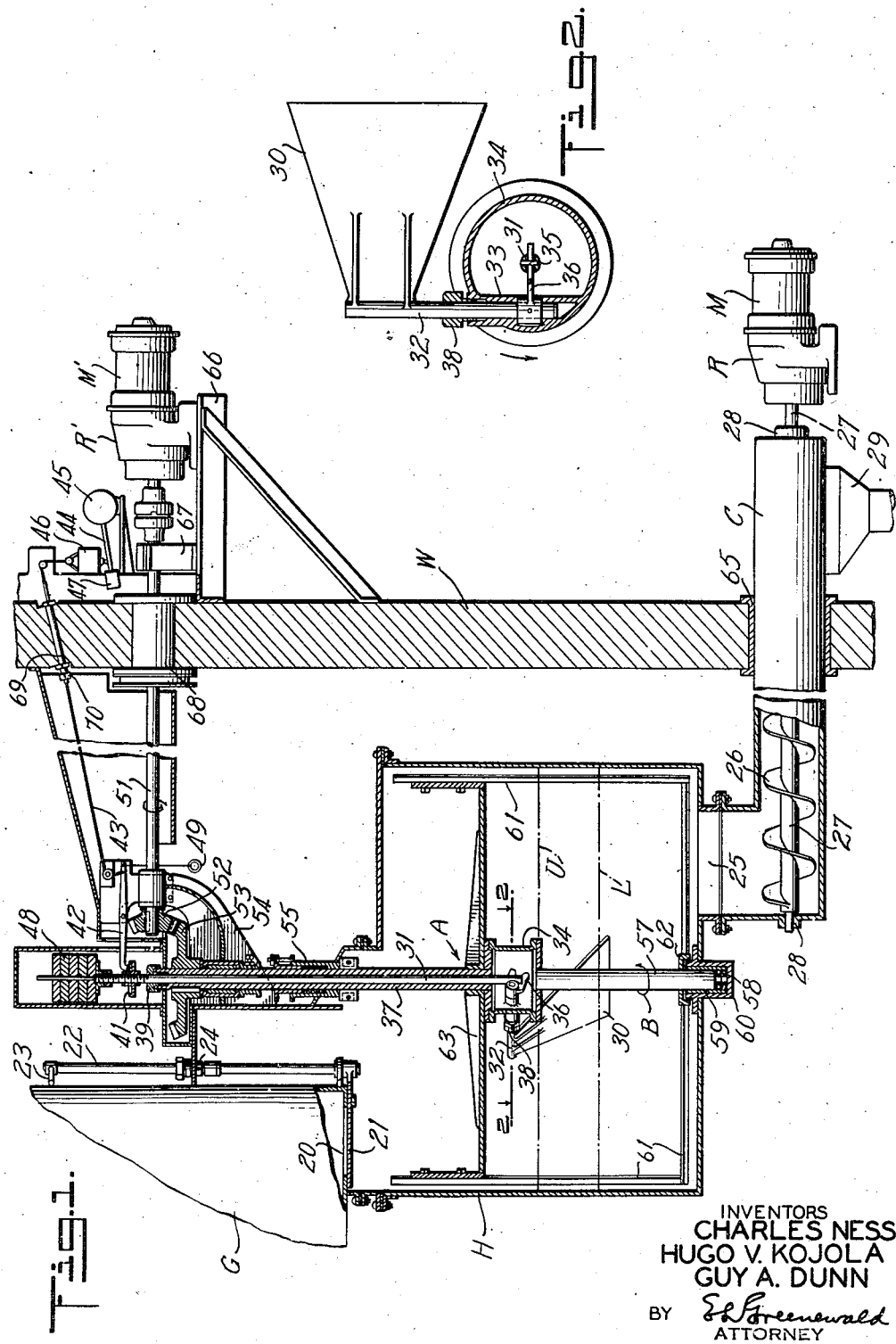
INVENTORS
CHARLES NESS
HUGO V. KOJOLA
GUY A. DUNN
BY *Greenewald*
ATTORNEY

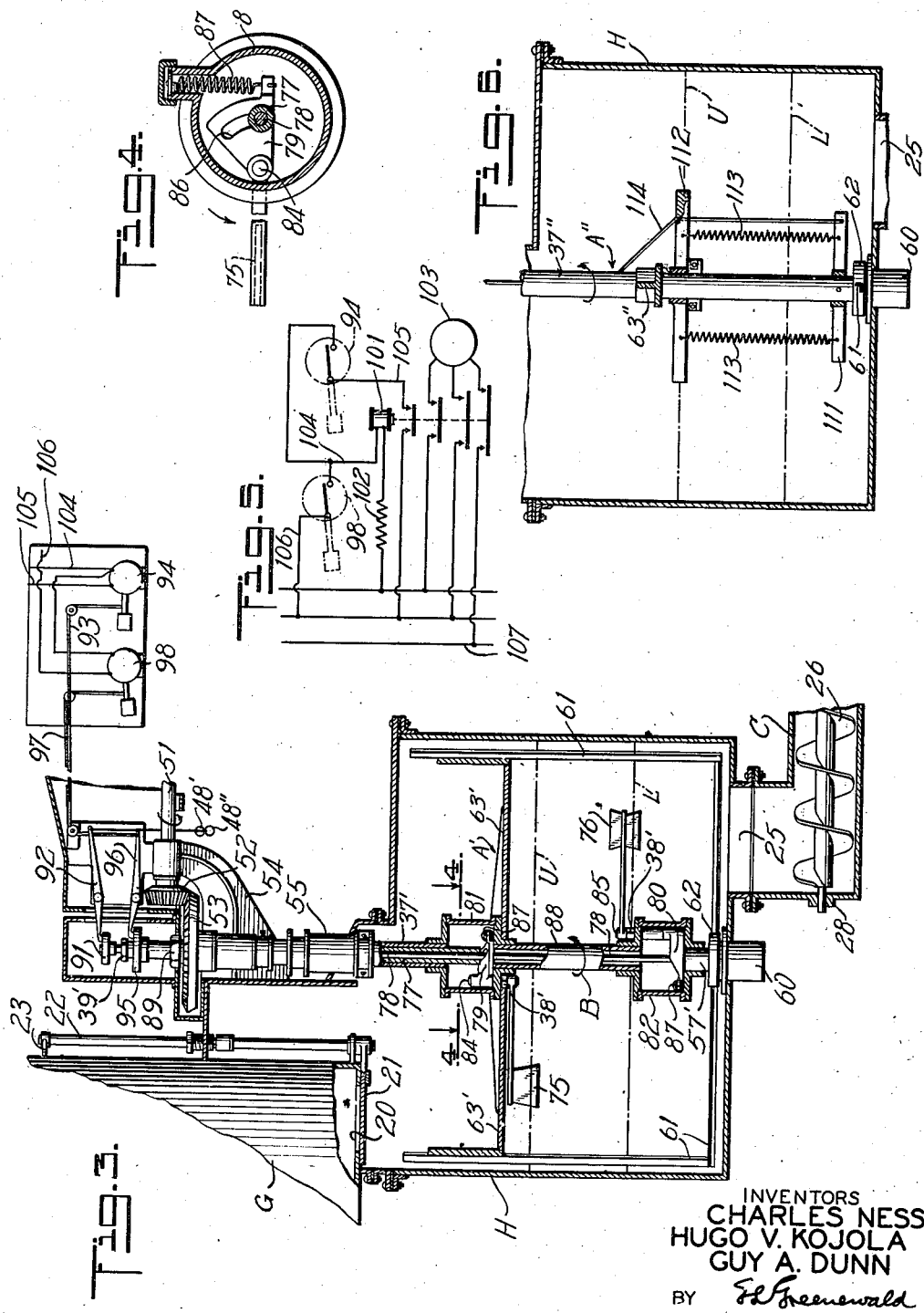

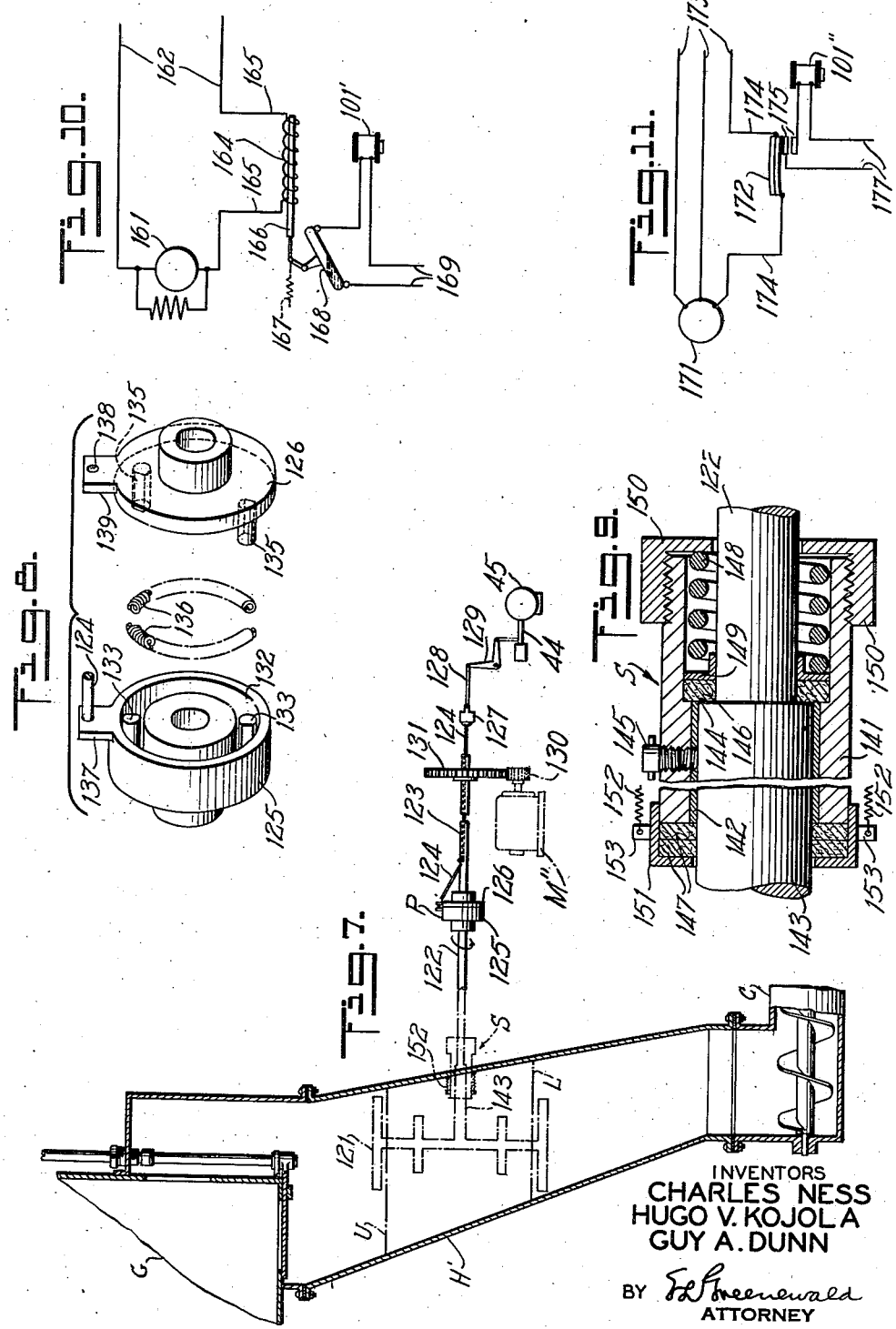

Patented Mar. 31, 1942

2,277,879

UNITED STATES PATENT OFFICE 2,277,879

APPARATUS FOR CONTROLLING THE LEVEL OF FINELY DIVIDED MATERIAL WITHIN CONTAINERS

Charles Ness, Indianapolis, Hugo V. Kojola, Whiting, and Guy A. Dunn, Beech Grove, Ind., assignors to The Prest-O-Lite Company, Inc., a corporation of New York Application October 12, 1938, Serial No. 234,546

14 Claims. (Cl. 214—17)

This invention relates to apparatus for controlling the level of finely divided material within a container or hopper having an inlet and outlet, and more particularly to apparatus for controlling the discharge of finely divided material from a container or hopper to which the finely divided material is fed continuously but is removed periodically. The principles of this invention are particularly applicable to the control of the level of finely divided lime hydrate in the lime hopper of a dry acetylene generator.

In the process of dry generation of acetylene, a moving body of calcium carbide is agitated and an amount of water is added thereto which is necessary to react the carbide completely and also an additional amount which by being vaporized reduces the temperature of the reaction mixture and so avoids a dangerous rise of temperature within the generator. In such a process, the lime hydrate resulting from the reaction of calcium carbide and water is produced in substantially a dry form, and is continuously discharged from the generating zone into a container or hopper. It is desirable to maintain within the hopper a predetermined level of finely divided lime to act as a seal in order to prevent the outflow of acetylene or inflow of air, which otherwise would form an explosive mixture, either in the generating room or in the generator itself. A screw conveyor, or similar means, is usually utilized in removing the dry lime hydrate from the lime hopper, and it is desirable to so control the operation of the removing means that the removing means will be started in operation when the lime within the hopper reaches an upper predetermined level and will be stopped when the lime within the hopper reaches a lower predetermined level.

Among the objects of this invention are to provide apparatus for controlling the level of finely divided material in a container or hopper in accordance with the resistance of the material to a moving element within the hopper; to provide apparatus for controlling the removal of finely divided material from a container or hopper in accordance with the level therein; to provide such apparatus which will operate automatically; to provide such apparatus which will function effectively and efficiently irrespective of the rate at which finely divided material is fed into the container or hopper; to provide such apparatus which is simple and effective in operation; and to provide a novel stuffing box for sealing shafts entering the container or hopper. Other objects and the novel features will become apparent from the following description and accompanying drawings, in which:

Fig. 1 is a vertical sectional view of a hopper and a conveyor for removing lime therefrom, and apparatus constructed in accordance with this invention for controlling the discharge of such lime;

Fig. 2 is an enlarged horizontal sectional view taken along the line 2—2 of Fig. 1;

Fig. 3 is a vertical sectional view of a lime hopper and conveyor similar to Fig. 1, illustrating a modification of the control apparatus of Fig. 1;

Fig. 4 is an enlarged horizontal sectional view taken along the line 4—4 of Fig. 3;

Fig. 5 is a diagrammatic plan of an electrical circuit of the control apparatus of Fig. 3;

Fig. 6 is a partial vertical sectional view of a lime hopper and a modification of the control apparatus of Fig. 3;

Fig. 7 is a vertical sectional view, partially diagrammatic, of a lime hopper and control apparatus forming another embodiment of this invention;

Fig. 8 is a perspective view of the coupling forming a part of the apparatus of Fig. 7, the coupling being disassembled for clarity of illustration;

Fig. 9 is an enlarged vertical sectional view of a stuffing box forming a part of the apparatus of Fig. 7;

Fig. 10 is a diagrammatic view of electrical control apparatus forming a modification of the apparatus of Fig. 7; and Fig. 11 is a diagrammatic view of electrical control apparatus forming a second modification of the apparatus of Fig. 7.

As illustrated more particularly in Fig. 1, Fig. 3, and Fig. 7, the substantially dry lime hydrate passes from the generating chamber of an acetylene generator G into a lime hopper H or H', from which it is removed by a screw conveyor C driven by a motor M. The conveyor C preferably is adapted to remove the lime at a rate in excess of the rate at which lime passes into the hopper, and the motor M is preferably started when the lime reaches an upper level U, and stopped when the lime has been removed down to a lower level L. With the depth of lime within the hopper at all times at or above the lower level L, an outflow of acetylene or an inflow of air will be prevented.

In accordance with this invention, and for controlling the operation of the motor M and conveyor C, or similar means for removing lime from the hopper, one or more movable elements are moved within the hopper through a predetermined preferably circular path or a path having predetermined upper and lower limits coinciding substantially with the upper and lower levels of the material in the hopper. The movable elements are preferably rotating paddles, and a suitable control means or mechanism for the motor M and conveyor C is associated therewith in such a manner that the resistance afforded to the movement of these elements by the material in the hopper will effect automatic operation of the lime removal means. In general, each movable element in the first embodiment, illustrated in Figs. 1-6, comprises a paddle or arm driven from a motor M', and changes in the resistance of lime to movement of this paddle cause a change in the angular relationship between the paddle and the shaft by which it is driven. In the second embodiment, illustrated in Figs. 7-11, a paddle or stirrer is continuously rotated within the lime hopper H' by a motor M'', and changes in resistance of lime to movement of the stirrer automatically control the motor driving the conveyor C. Force imposing means, such as weights or resilient means, are provided to resist displacement of the paddles or stirrers from their normal position due to resistance of the material in the container.

Referring more particularly to the embodiment of the invention illustrated in Figs. 1 and 2, finely divided and pulverous dry lime hydrate passes from the generating zone of the acetylene generator G into the lime hopper H through an outlet opening 20 controlled by a plate valve 21. The plate valve 21 is operated by a rod 22 having a handle 23 outside the hopper, the rod 22 passing through a stuffing box 24 in the upper wall of the hopper. As lime accumulates in the hopper H, it is removed through an outlet 25 in the lower end thereof by a helicoid screw 26 in the conveyor C, the screw 26 being attached to a shaft 27 journalled in bearings 28 and rotated by the motor M through an integral speed reducer R. From an outlet 29 of the conveyor C, the lime may be deposited in a bin or other suitable storage means pending subsequent disposal.

A hollow shaft assembly A, which is rotated in the direction of arrow B at a relatively slow speed, such as about 3 R. P. M., includes a relatively wide paddle 30 which is adapted to move a push rod 31 upwardly and downwardly in accordance with the level of lime within the hopper. The paddle 30 is formed integrally with a stub shaft 32 which is journalled in a sleeve 33 offset from the center of a cylindrical housing 34. The lower end of the push rod 31 is slotted, and is provided with a pin 35, the pin cooperating with a forked yoke 36 secured to stub shaft 32 within housing 34. The forked outer end of yoke 36 extends into the slot in push rod 31 and pin 35 is disposed between the forked ends of yoke 36, these forked ends moving rod 31 by contact with pin 35. The assembly A also includes a hollow shaft 37 to which housing 34 is secured and through which push rod 31 passes, and the rise or fall of lime within the hopper will cause a change in the angular relationship between paddle 30 and shaft 37, thereby effecting a corresponding change in the position of push rod 31.

The housing 34 is filled with a lubricating medium, such as oil, which also permeates between push rod 31 and hollow shaft 37 to lubricate the same, and also serves as a sealing medium. A packing gland 38 secured to sleeve 33 and a packing gland 39 at the upper end of hollow shaft 37 retain the lubricant within the assembly.

A disk 41 which rotates therewith is secured to the upper end of push rod 31, and is adapted to move one end of a lever 42 upwardly and downwardly in accordance with the movement of the push rod. The other end of lever 42 is connected by a cable 43 with an operating arm 44 of a snap-action switch 45 which controls the motor M. A weight 46 insures a continuous tension on cable 43, while weight 47 will cause the operating arm 44 to drop and thereby shut off the motor M should arm 44 become disconnected from cable 43 and weight 46. In addition, weights 48 carried by the upper end of push rod 31 tend to force the push rod downwardly at all times.

Due to its rotation, paddle 30 will always ride upon the top of the body of accumulated lime within the hopper, and when the lime has risen to the upper level U, paddle 30 will have been moved upwardly from its normal downwardly extending position and will have pushed rod 31 a sufficient distance upwardly to rock lever 42 and thereby exert a pull on cable 43; this will cause switch 45 to snap closed, thus starting the motor M. When the lime within the hopper has fallen to the lower level L, paddle 30 (moving downwardly with the lime) will cause rod 31 to be lowered, causing switch 45 to snap open, thus stopping the motor M and conveyor C. The removal of lime from the hopper H will continue in the same manner, the level of lime within the hopper being automatically maintained between predetermined lower and upper levels.

For starting the motor M manually if desired, a hand pull ring 49 is connected to the end of lever 42 by a suitable cable.

The assembly A is rotated at its relatively slow speed by a motor M' provided with an integral speed reducer R' connected to one end of a shaft 51. A bevel pinion 52 is attached to the other end of shaft 51, and bevel pinion 52 in turn drives a bevel gear 53 secured to the upper end of hollow shaft 37. Hollow shaft 37 and one end of shaft 51 are journalled in suitable bearings in a bracket 54, and a stuffing box 55 seals shaft 37 where it passes through the hopper H.

The assembly A also includes a lower shaft 57, resting on a thrust bearing 58 and journalled in a sleeve bearing 59 mounted in a well 60 at the bottom of the hopper. A U-shaped scraper or sweep-frame 61 removes any incrustation of lime from the walls and bottom of the hopper, being secured at its lower end to shaft 57 by an inverted collar 62, which prevents entry of lime into well 60 and bearings 58 and 59. The scraper 61 at its upper end is secured to hollow shaft 37 by arms 63 attached to shaft 37 adjacent housing 34.

To prevent possible ignition of any air-acetylene mixture which might be present in the generator room, all electrical apparatus is preferably disposed outside the generator room, the conveyor C passing through a wall W of the room and an air-tight fitting 65 being provided at the wall for sealing purposes. The motor M' is mounted on a platform 66 attached to the wall W outside the generator room, and switch 45 is also mounted outside the generator room. One end of shaft 51 is journalled in a bearing 67 mounted on platform 66, and shaft 51 passes through an air-tight housing 68 mounted in wall W, while cable 43 passes through a pipe 69, mounted in the wall and provided with a stuffing box 70.

In the embodiment of the invention illustrated in Figs. 3-5, the acetylene generator G, hopper H, and conveyor C are substantially identical with those illustrated in Figs. 1 and 2. A shaft assembly A', which includes a hollow shaft 37' and scraper 61, is rotated at a relatively slow speed in the direction of arrow B, as before, by a suitable motor through pinion 52 attached to shaft 51 and bevel gear 53 attached to shaft 37', shafts 37' and 51 being journalled in bracket 54. The assembly A' also includes an upper paddle 75 and a lower paddle 76, respectively responsive to the upper and lower lime levels within the hopper. Disposed within hollow shaft 37' are a hollow push rod 77 and a solid push rod 78, the hollow rod 77 being actuated by upper paddle 75 through a cam 79, and the rod 78 being actuated by lower paddle 76 through a cam 80. Cam 79 is disposed within an upper housing 81 while cam 80 is disposed within a lower housing 82. Upper paddle 75 and cam 79 are keyed to opposite ends of a vertical stub shaft 84, and lower paddle 76 and cam 80 are keyed to opposite ends of a stub shaft 85, stub shafts 84 and 85 being journalled in upper and lower housings 81 and 82, respectively. Cams 79 and 80 are substantially identical in shape and size, except that upper cam 79 is provided with an arcuate slot 86, as in Fig. 4, through which solid push rod 78 passes. A resilient means such as a spring 87 is disposed in each of housings 81 and 82, each spring acting to pull the respective cam and paddle in the direction of rotation and against the resistance of lime so as to cause either paddle to move in the direction of rotation and thereby cause rods 77 and 78 to be lowered when the lime level has fallen sufficiently below either paddle.

Housings 81 and 82 are connected by a hollow shaft 88 through which rod 78 passes; a lower shaft 57', to which housing 82 and collar 62 are attached, is journalled in well 60 in a manner similar to that previously described; and arms 63' are attached at one end to hollow shaft 88 adjacent housing 81 and at the other end to scraper 61. Housings 81 and 82, as well as hollow shaft 88, are filled with a suitable lubricating medium, such as oil, the lubricant also permeating between push rods 77 and 78 and hollow shaft 37' and acting also as a gas seal. For sealing purposes, stub shafts 84 and 85 are each provided with a packing gland 38', while hollow rod 77 and hollow shaft 37' are provided at their upper ends with packing glands 39' and 89, respectively.

A disk 91 is secured to the upper end of push rod 78, the disk engaging one end of a lever 92; and the opposite end of lever 92 is connected by a cable 93 with the operating arm of a lower level switch 94. A disk 95 is similarly secured to the upper end of hollow push rod 77, disk 95 engaging one end of a lever 96 and the opposite end of the lever being connected by a cable 97 with the operating arm of an upper level switch 98. Hand pull rings 48' and 48" are connected by suitable cables to the ends of levers 92 and 96, respectively, for operating the switches manually, if desired.

An electrical circuit, as in Fig. 5, which acts in conjunction with the switches 94 and 98 in controlling the motor driving the helicoid screw 26, includes a three phase switch operated by a relay 101. One side of the winding of relay 101 is connected through a resistance 102 to one phase of the line supplying current to winding 103 of a three phase A. C. conveyor driving motor, and the other side of the relay is connected by a common wire 104 to one side of each of switches 94 and 98. The other side of lower level switch 94 is connected by a line 105, which includes a secondary control switch operated by relay 101, to a second phase of the supply line; and the other side of upper level switch 98 is connected by a wire 106 to the second phase of the supply line. The switch 94 will always be closed when the height of lime within the hopper is above the lower level L, since, due to the resistance of the lime, lower paddle 76 will lag backwardly against the tension of spring 87, and push rod 78 will be forced upwardly to rock lever 92, thereby closing switch 94. However, closing of switch 94 will not start the driving motor since the switch in line 105 will be open until relay 101 operates. When lime reaches the upper level U, the resistance to rotation of upper paddle 75 will cause the upper paddle to lag backwardly from its normal position against the tension of spring 87 and push hollow rod 77 upwardly, thereby rocking lever 96 and closing switch 98. When switch 98 is closed, the starting circuit through relay 101 will be completed, and the three phase switch controlling the driving motor will be closed, as well as the switch in line 105. When the level of lime drops below the upper level U and switch 98 is opened, the driving motor will still operate, since both switch 94 and the switch in line 105 will remain closed, the relay 101 acting as a holding relay. However, when the level of lime drops to the lower level L, sufficient resistance to the rotation of lower paddle 76 will no longer be offered by the lime, switch 94 will be opened, relay 101 will no longer be energized, and the three phase switch controlling the winding 103 as well as the switch in line 105 will drop open, thereby stopping the driving motor. When lime again builds up within the hopper above the lower level L and offers sufficient resistance to rotation of paddle 76 to displace the paddle from its normal position, switch 94 will be closed, but will not start the driving motor since the switch in line 105 will still be open. But when the level of lime again reaches the upper level U, switch 98 will be closed, again energizing relay 101, and the driving motor will again be started. The removal of lime will continue in this manner, the level of lime within the hopper always being maintained between predetermined lower and upper levels. Obviously, a D. C. driving motor may be used, but the essential elements of the control circuit will remain the same, line wire 107 and its corresponding phase switch being omitted.

The embodiment of the invention illustrated in Fig. 6 is similar in many respects to the two embodiments of the invention just described, a shaft assembly A" including a hollow shaft 37" extending downwardly to the bottom of the hopper and journalled in well 60 in a manner similar to that previously described. Arms 63", similar to arms 63 and 63' of Figs. 1 and 3, and scraper 61 are attached to the hollow shaft. The assembly A" is rotated at a relatively slow speed by suitable means (not shown, but preferably similar to the rotating means of the two modifications just described), and lime is removed from outlet 25 of hopper H by suitable conveying means, preferably similar to that of Fig. 1.

In the assembly A", a fixed arm 111 is keyed to hollow shaft 37" adjacent the lower end thereof, and a floating arm 112 is journalled on shaft 37" adjacent the upper level U. The floating arm 112 is rotated by fixed lower arm 111 through springs 113, the resistance of lime to rotation of springs 113 and floating arm 112 effecting a change in the angular relationship between floating arm 112 and hollow shaft 37". A cable 114, attached to one end of fixed arm 111 and passing through a suitable hole in the corresponding end of floating arm 112 and thence into the shaft 37", operates a suitable snap-action switch, preferably similar to switch 45 of Fig. 1, for controlling the driving motor for the lime removal conveyor. Cable 114 and hollow shaft 37" preferably pass through suitable stuffing boxes in a manner similar to that of the previous modifications.

Cable 114 and the snap-action switch are preferably so correlated that when the height of lime has reached upper level U, the resistance of lime to rotation of floating arm 112 will cause a change in the angular relationship between floating arm 112 and both shaft 37" and fixed arm 111 sufficient to shorten the effective length of cable 114, thereby closing the switch to start the conveyor driving motor. In addition, the snap-action switch may be so connected with cable 114 that when the level of lime has dropped to the lower level L, the resistance thereof to rotation of springs 113 will exert a sufficiently less pull on cable 114 to cause the switch to snap open, thereby stopping the conveyor driving motor.

In the embodiment of the invention illustrated in Figs. 7-9, a paddle or stirrer 121 is rotated about a horizontal axis, a horizontal shaft 122 passing through a stuffing box S into a hopper H'. In this embodiment, the lower level of lime may be maintained at a higher predetermined position, if desired, in order to provide a more effective seal. Resistance to rotation of stirrer 121 will cause a change in the angular relationship between the stirrer and a hollow drive shaft 123, and also between the two halves of a spring loaded coupling P. This movement of the two halves of the coupling relative to each other will exert a pull on a cable 124 attached to driven half 125 of coupling P and passing through driving half 126 of coupling P and also through hollow shaft 123. Cable 124 is attached to swivel joint 127, which permits relative rotation of cable 124 with respect to a cable 128. A pull on cable 124 will be transmitted through the swivel joint and cable 128 to a lever 129, the opposite end of which is attached to operating arm 44 of snap-action switch 45 controlling the conveyor driving motor. Hollow shaft 123 is driven by a motor M" through a reduction pinion 130 and a gear 131 keyed to shaft 123.

The control apparatus of Fig. 7 operates in substantially the same manner as that of Fig. 1, and the lengths of cables 124 and 128 are preferably so proportioned that at any predetermined upper height of lime within the hopper H', such as upper level U, resistance to rotation of paddle 121 will cause switch 45 to snap closed and start the conveyor driving motor, while at any predetermined lower height of lime within the hopper, such as lower level L, reduced resistance to rotation of paddle 121 will cause switch 45 to snap open and stop the conveyor driving motor.

The coupling P, as in Fig. 8, comprises a female or driven half 125 keyed to shaft 122 and provided with a groove or recess 132 and a pair of oppositely-disposed pins 133. Male or driving half 126 of coupling P is keyed to shaft 123, and is provided with oppositely-disposed pins 135 which extend into recess 132 in the female half when the coupling is assembled. Disposed between each set of pins is a coil spring 136, which transmits rotation of shaft 123 to shaft 122, but permits the male and female halves of the coupling to twist relative to each other upon the interception of lime by stirrer 121 and resistance to rotation thereof. Cable 124 is fastened to an ear 137 on the female half of the coupling, and passes through a suitable hole 138 in a similar ear 139 on the male half of the coupling. When resistance to rotation of paddle 121 is offered by the lime and the two halves of the coupling twist relative to each other, a pull will be exerted on cable 124 due to a displacement of ear 139 with respect to ear 137.

The novel stuffing box assembly S, as in Fig. 9, includes a shell 141 secured in a suitable aperture in the side of the hopper H' in a suitable manner, such as by welding. A bushing 142, made of cast iron or other suitable long-wearing bearing material, is pressed into shell 141 to provide a bearing for an enlarged end 143 of shaft 122, the enlarged end terminating at a shoulder 144. Bushing 142 may be lubricated by means of a standard grease cup connection 145, and grease is retained between the bearing surfaces by a felt washer 146 bearing against shoulder 144 and a pair of felt washers 147 bearing against the ends of shell 141 and bushing 142. Washer 146 is resiliently held against shoulder 144 by a spring 148 acting between a steel washer 149 and a stuffing box nut 150, which is threadedly secured to shell 141 outside the hopper and by means of which the tension of spring 148 may be adjusted. Washers 147 are held in contact with the end of the shell and bushing and are also forced against the shaft by a cap 151, which is held in position and resiliently forced against washers 147 by springs 152 secured to the inner wall of the hopper and to ears 153 formed on cap 151.

This novel stuffing box not only provides a bearing for the shaft, but also prevents an outflow of acetylene or an inflow of air, since grease filling the machined clearance between the shaft and bushing 142 also tends to saturate washers 146 and 147, thereby providing an effective seal against any passage of gas.

In the modifications of the control apparatus illustrated in Figs. 10 and 11, control of the conveyor driving motor is effected electrically, and these modifications are particularly applicable to the apparatus illustrated in Fig. 7, the electrical circuit and parts shown being substituted for coupling P and parts associated therewith. However, these modifications may be utilized in other instances in which a paddle or scraping means is rotated within the lime hopper, such as the scraper 61 of Fig. 1 or Fig. 3. The modification illustrated in Fig. 10 is adapted to be utilized in connection with a D. C. motor driving a paddle or scraper within the hopper, while the modification illustrated in Fig. 11 is adapted to be utilized in connection with an A. C. motor.

When the driving means for the paddle or scraper within the hopper is a D. C. motor 161, as in Fig. 10, current is supplied thereto from a line 162, and a solenoid 164 is connected in series with the motor by wires 165. When resistance of lime to rotation of the paddle or scraper within the hopper has increased to a predetermined extent, thereby increasing the current drawn by the paddle or scraper motor, the current in line 162 and through solenoid 164 will also increase. Upon this increase in current, the solenoid will exert a sufficient pull upon an armature 166 to overcome the resistance of a spring 167 and throw a mercury contact switch 168 into closed position. The switch 168 is connected in one side of a line 169 supplying current to a switch relay 101' which controls the conveyor driving motor, such as in a manner similar to that of the relay 101 of Fig. 5. When switch 168 closes, relay 101' will become energized, thereby starting the motor driving the lime removal conveyor. When current drawn by motor 161 decreases due to the falling of the lime to a lower predetermined level, the current passing through solenoid 164 will also decrease, and the pull of spring 167 will be sufficient to open switch 168, thereby opening the circuit through relay 101' and shutting off the motor driving the lime removal conveyor. The pull of solenoid 164 and tension of spring 167 may be so correlated that the lime removal conveyor motor will be started and stopped when lime within the hopper reaches any predetermined upper and lower levels, respectively, merely by adjusting the tension of spring 167 and the number of turns in solenoid 164. Obviously, such adjustment may be obtained in a number of different ways.

When the motor driving the paddle or scraper within the hopper is an A. C. motor 171, as in Fig. 11, a bimetallic strip 172 is connected in series with one phase of line 173 supplying the motor 171, through wires 174. An increase in the current flowing through the field windings of motor 171, due to a greater resistance of lime to the movement of a paddle or scraper within the hopper, will cause a greater flow of current through the bimetallic strip. A greater flow of current through strip 172 will cause the strip to become heated and bend downwardly, due to the differential expansion of its metallic parts. This will operate to close contacts 175, which are interposed on one side of a line 177 supplying current to switch relay 101'' which controls the motor driving the lime removal conveyor, as before. When strip 172 becomes heated and closes the contacts 175, the lime removal conveyor motor will be started, and when the resistance to rotation of the paddle or scraper by the lime has decreased to a sufficient extent, due to fall of the lime to a lower predetermined level, a lesser amount of current will be drawn by motor 171 and a correspondingly lesser amount of current will flow through strip 172. The smaller flow of current through strip 172 will cause the heating effect in strip 172 to decrease, and strip 172 will bend upwardly again to open contacts 175, thereby stopping the motor driving the lime removal conveyor. The contact 175 carried by the bimetallic strip 172 is preferably insulated therefrom by suitable means, such as rubber. Obviously, a suitable thermostatic switch of any other type may be substituted for the bimetallic strip 172.

It will be understood that the principles of this invention may be applied to apparatus for controlling the level of finely divided material other than lime, such as pulverous and finely divided carbide being fed into a hopper, from which, in turn, the carbide is fed into an acetylene generator. In such a case, the conveyor C will feed the carbide into the hopper, rather than removing it therefrom, but the control of the level of finely divided material within the hopper or container will be effected in substantially the same manner as previously described. Other changes may be made without departing from the spirit and scope of this invention.

What is claimed is:

1. In apparatus for maintaining the level of finely divided material in a container within predetermined upper and lower limits, the combination comprising a motor driven conveyor for conveying such finely divided material between the interior of said container and a point outside thereof; control means for the conveyor motor; at least one element mounted within said container and movable through a predetermined circular path in the container; a shaft; means for rotating said shaft; means operatively connecting said shaft to said element to rotate said element through such predetermined circular path in the container, said means being operative to provide for a lag in the rotation of said element with respect to said shaft due to resistance of material in said container to movement of said element when material in said container reaches a predetermined level; and means operative in response to such lag in the rotation of said element to actuate said control means.

2. In apparatus as claimed in claim 1, resilient means tending to resist a lag in the rotation of said element with respect to said shaft, the resistance of the material to rotation of said element overcoming the force of said resilient means thereby to cause such lag in the rotation of said element.

3. In apparatus for maintaining the level of finely divided material in a container within predetermined upper and lower limits, the combination comprising a motor driven conveyor for conveying such finely divided material between the interior of said container and a point outside thereof; a single element rotatably mounted in said container; a shaft; means for rotating said shaft; means operatively connecting said shaft to said element, said means being operative to provide for changes in the angular relation of said element to said shaft due to the resistance offered by said material to movement of said element; control means operative in response to a predetermined angular relation of said element to said shaft when said material reaches a predetermined upper level in said container, to start the conveyor motor; said control means also being operative, in response to another predetermined angular relation of said element to said shaft when said material reaches a predetermined lower level in said container, to stop the conveyor motor.

4. Apparatus for controlling the level of finely divided material within a container, comprising means for conveying such finely divided material between the interior of said container and a point outside thereof; a rotatable shaft extending into said container; means for rotating said shaft; a paddle disposed within said container and rotated by said shaft, said paddle being pivotally mounted at a longitudinally fixed point on said shaft, and being so arranged that a rise in the level of such material within said container will cause a change in the angular relationship of said paddle with respect to said shaft; and means actuated upon such change in angular relationship for controlling said conveying means.

5. In apparatus for maintaining the level of finely divided material in a container within predetermined upper and lower limits, the combination comprising a motor driven conveyor for conveying such finely divided material between the interior of said container and a point outside thereof; control means for the conveyor motor; at least one paddle rotatably mounted within said container for rotation normally through a circular path and arranged to have contact with the material therein at least when said material reaches a predetermined level in said container; a shaft; means for rotating said shaft; means operatively connecting said shaft to said paddle to rotate said paddle, said means being operative to provide for a change in the angular relation of said paddle to said shaft due to the resistance offered by said material to movement of said paddle in its normal path; and means operative in response to such change in the angular relation of said paddle to said shaft to actuate said conveyor motor control means.

6. In apparatus as claimed in claim 5, force imposing means tending to resist a change in the angular relation of said paddle to said shaft.

7. Apparatus for controlling the level of finely divided material within a container, comprising means for conveying such finely divided material between the interior of said container and a point outside thereof; a pivoted paddle disposed within said container; means including a hollow shaft for rotating said paddle within said container; a rod movable within said hollow shaft and operably connected with said paddle so as to be actuated in accordance with variations in the level of material within said container, such variations causing said paddle to pivot; and means actuated by said rod for controlling the operation of said conveying means.

8. Apparatus as defined in claim 7, in which said paddle is pivoted about an axis substantially perpendicular to the axis of said hollow shaft.

9. Apparatus as defined in claim 7, in which said paddle is pivoted about an axis substantially parallel to the axis of said hollow shaft.

10. Apparatus for controlling the level of finely divided lime hydrate in the lime hopper of an acetylene generator, comprising means for removing such lime from said hopper; a hollow shaft extending into said hopper; a housing secured to and rotatable with said shaft within said hopper; a push rod movable longitudinally within said shaft; a paddle disposed within said hopper and mounted on a stub shaft carried by said housing; means for rotating said hollow shaft; means for moving said rod longitudinally of said hollow shaft when said paddle is caused to pivot about the axis of said stub shaft due to a change of the level of lime within said hopper; and means actuated by movement of such rod for controlling said removing means.

11. Apparatus as defined in claim 10, in which said housing is filled with a sealing and lubricating medium.

12. Apparatus for controlling the discharge of finely divided lime hydrate from the lime hopper of an acetylene generator, comprising means for removing accumulated lime from the outlet of said hopper; a hollow shaft extending vertically into said hopper; a push rod movable within said hollow shaft; a relatively broad flat paddle disposed within said hopper and pivoted about a substantially horizontal axis, said paddle being rotatable with said hollow shaft; means for rotating said hollow shaft; means operatively connecting said paddle and said push rod for moving said push rod upwardly and downwardly in response to upward and downward pivotal movement of said paddle caused by a rise or fall of the level of lime within said hopper; and means actuated by movement of said push rod for controlling said removing means.

13. Apparatus for controlling the discharge of finely divided lime hydrate from the lime hopper of an acetylene generator, comprising means for removing accumulated lime from the outlet of said hopper; a hollow vertical shaft extending into said hopper; means for rotating said shaft; a hollow push rod movable vertically within said hollow shaft; a second push rod movable vertically within said hollow push rod; a paddle disposed within said hopper and rotatable with said hollow shaft at an upper predetermined level in said hopper; a second paddle disposed within said hopper and rotatable with said hollow shaft at a lower predetermined level in said hopper; cams engaging the lower end of each of said push rods; means operatively connecting said paddles with said cams; resilient means for urging each of said paddles in the direction of rotation whereby either of said paddles will tend to lag due to an interception of lime by said paddles and such lag will cause said cams to move said push rods within said hollow shaft; and means actuated by movement of said push rods for controlling the operation of said removing means.

14. In apparatus for controlling the level of finely divided material within a container, the combination of means for conveying such material between the interior of said container and a point outside thereof; a hollow vertical shaft extending into said container; means for rotating said shaft; a lower paddle secured to said shaft and rotatable therewith; an upper floating paddle pivoted on said shaft; resilient means connecting said lower paddle and said upper paddle for rotating said upper paddle along with said lower paddle, said upper paddle tending to lag behind its normal rotation when material within said container rises in level to resist rotation of said upper paddle; and a cable attached to said lower paddle and passing through one end of said upper paddle and thence into said hollow shaft whereby such a lag in the rotation of said upper paddle will tend to shorten the effective length of said cable

CHARLES NESS.
HUGO V. KOJOLA.
GUY A. DUNN.